(12) United States Patent
Lee et al.

(10) Patent No.: US 10,676,546 B2
(45) Date of Patent: Jun. 9, 2020

(54) HYDROCARBON RESIN, METHOD FOR PREPARING HYDROCARBON RESIN, AND ADHESIVE COMPOSITION

(71) Applicant: KOLON INDUSTRIES, INC., Gwacheon-si, Gyeonggi-do (KR)

(72) Inventors: Sang Hyun Lee, Yongin-si (KR); Jun Hyo Park, Yongin-si (KR); Joong Suk Lee, Yongin-si (KR); Min Sik Cho, Yongin-si (KR)

(73) Assignee: KOLON INDUSTRIES, INC., Gwacheon-si, Gyeonggi-Do (KR)

( * ) Notice: Subject to any disclaimer, the term of this patent is extended or adjusted under 35 U.S.C. 154(b) by 0 days.

(21) Appl. No.: 15/741,051

(22) PCT Filed: Dec. 31, 2015

(86) PCT No.: PCT/KR2015/014583
§ 371 (c)(1),
(2) Date: Dec. 29, 2017

(87) PCT Pub. No.: WO2017/003056
PCT Pub. Date: Jan. 5, 2017

(65) Prior Publication Data
US 2018/0186904 A1 Jul. 5, 2018

(30) Foreign Application Priority Data
Jun. 30, 2015 (KR) .......................... 10-2015-0093773

(51) Int. Cl.
| | | |
|---|---|---|
| *C08F 8/04* | (2006.01) | |
| *C08F 210/14* | (2006.01) | |
| *C08F 2/06* | (2006.01) | |
| *C09J 123/26* | (2006.01) | |
| *C08F 232/08* | (2006.01) | |
| *C09J 145/00* | (2006.01) | |
| *C08F 236/20* | (2006.01) | |

(52) U.S. Cl.
CPC .................. *C08F 8/04* (2013.01); *C08F 2/06* (2013.01); *C08F 210/14* (2013.01); *C08F 232/08* (2013.01); *C09J 123/26* (2013.01); *C09J 145/00* (2013.01); *C08F 236/20* (2013.01); *C08F 2800/10* (2013.01)

(58) Field of Classification Search
CPC .. C08F 8/04; C08F 210/14; C08F 2/06; C08F 232/08; C08F 2800/10; C08F 236/20; C09J 123/26; C09J 145/00
USPC ....................................................... 525/332.1
See application file for complete search history.

(56) References Cited

U.S. PATENT DOCUMENTS

| | | | | |
|---|---|---|---|---|
| 5,410,004 A | * | 4/1995 | Williams | ................ C08F 32/08 526/237 |
| 5,652,308 A | | 7/1997 | Merrill et al. | |
| 6,232,407 B1 | * | 5/2001 | Hashidzume | ............. C08F 8/04 525/331.7 |
| 6,755,963 B2 | * | 6/2004 | Haluska | .................. B01J 23/85 208/143 |
| 9,273,166 B2 | * | 3/2016 | Stewart | ................. C07C 255/31 |
| 2002/0107332 A1 | * | 8/2002 | Klosiewicz | ............... C08F 8/04 525/333.3 |
| 2014/0088277 A1 | * | 3/2014 | Stewart | ................... C07C 13/68 526/171 |

FOREIGN PATENT DOCUMENTS

| | | | |
|---|---|---|---|
| JP | 10-176178 A | 6/1998 | |
| JP | 2006-083327 A | 3/2006 | |
| JP | 2015-054892 A | 3/2015 | |
| KR | 2013-0111233 A | 10/2013 | |
| KR | 10-2014-0086109 A | 7/2014 | |
| KR | 10-2014-0086110 A | 7/2014 | |
| KR | 10-2015-0031700 A | 3/2015 | |
| KR | 2015-0031700 | * 3/2015 | |
| KR | 1020150031700 A | * 3/2015 | ............ C08F 240/00 |

* cited by examiner

*Primary Examiner* — Michael Bernshteyn
(74) *Attorney, Agent, or Firm* — Novick, Kim & Lee, PLLC; Jae Youn Kim

(57) ABSTRACT

This invention relates to a hydrogenated hydrocarbon resin and a method of preparing the same, wherein the preparation process is simplified, material supply problems can be solved, and the hydrogenated hydrocarbon resin can be prepared using a catalyst, which is inexpensive, has a low odor and is easy to handle, thereby realizing a yield and a preparation process that enable real-world application thereof. The hydrogenated hydrocarbon resin prepared by the method of the invention has excellent compatibility and a low specific viscosity, and can thus be efficiently used as a tackifier or an adhesive in a variety of fields.

3 Claims, 4 Drawing Sheets

HYDROCARBON RESIN, METHOD FOR PREPARING HYDROCARBON RESIN, AND ADHESIVE COMPOSITION

TECHNICAL FIELD

The present invention relates to a hydrocarbon resin, a method of preparing the same, and an adhesive.

BACKGROUND ART

A hydrocarbon resin is a representative tackifier and is mainly used as a material that imparts tackiness or adhesiveness to adhesive tape or products such as paint, ink, rubber, tires, etc. It is a thermoplastic resin in a liquid or solid phase at room temperature and may be provided in various forms ranging from a transparent semi-fluid liquid to a light yellow or water white solid.

A hydrocarbon resin, especially a hydrogenated hydrocarbon resin, is a thermoplastic resin prepared from a high-grade unsaturated hydrocarbon contained in thermal pyrolysis oil such as naphtha or the like in petrochemical plants, and has excellent resistance to heat and ultraviolet (UV) rays and may be adhesive, and thus may be variously utilized in medical supplies, woodworking articles and sanitary articles.

Although the number of products using hydrocarbon resin is increasing every year, the production of C5 and C9 oil fractions, currently useful as the main materials for hydrocarbon resin, is decreasing, and the shortage of material for hydrocarbon resin may become severe.

Meanwhile, in the case of a hydrogenated hydrocarbon resin, it is difficult to completely remove unreacted materials, a solvent and a low-molecular-weight oligomer during the preparation thereof, and thus, upon the manufacture of sanitary products such as diapers and the like, which involves spraying an adhesive at a high temperature, the odor of the hydrocarbon resin itself is generated, and may be released when the final product thereof is unpacked. Furthermore, the hydrogenated hydrocarbon resin may generate an offensive odor peculiar thereto when melted at a high temperature, thus adversely affecting working environments. Moreover, when it is applied to sanitary products, limitations are imposed on satisfying the needs of consumers who require the use thereof on sensitive skin, owing to odor-inducing factors.

Accordingly, since the requirement to control the odor of the hydrocarbon resin used for sanitary products is increasing with an increase in the standard of living of consumers, there is an urgent need to develop techniques for reducing the odor of the hydrocarbon resin.

In this regard, U.S. Pat. No. 5,652,308 discloses a tackifier resin in which a C3 monomer, propylene, and dicyclopentadiene (DCPD) obtained from a C5 monomer, are copolymerized using a metallocene catalyst, whereby a portion of the C5 monomer is substituted with the C3 monomer. However, when a hydrocarbon resin is prepared using the above method, an expensive metallocene catalyst, which is very vulnerable to oxygen and water, has to be used, thus causing problems of complicated process designs, high manufacturing costs and a very low yield of less than 30%, making it difficult to achieve real-world application thereof.

Also, the use of a C3 oil fraction, which is in a gas phase, requires an additional process and apparatus for the liquefaction thereof, and additional investment costs related to high-pressure reactors may be incurred, and real-world application thereof becomes difficult unless the high-pressure reactor is provided.

Moreover, Korean Patent Application No. 2013-0111233 discloses a method of preparing a hydrocarbon resin using propylene (C3 oil fraction) as an olefin, but problems such as low yield and strong odor may still occur.

DISCLOSURE

Technical Problem

Accordingly, the present invention is intended to provide a hydrocarbon resin, a method of preparing the same, and an adhesive composition including the same, in which material supply problems with hydrocarbon resin may be solved, and moreover, a preparation process and yield of the hydrocarbon resin that enable real-world application thereof may be ensured, and furthermore, odor problems may be alleviated.

Technical Solution

Therefore, the present invention provides a method of preparing a hydrocarbon resin, comprising: (S1) preparing a mixture by mixing a diolefin, a polymerization controller and an initiator; (S2) preparing a polymer by polymerizing the mixture of S1 through the addition of a C6-C20 olefin and a cation catalyst; and (S3) hydrogenating the polymer of S2 through the addition of a hydrogenation catalyst.

Here, the olefin is preferably a C6-C20 olefin, and more preferably a C6-C12 olefin.

In S1, the diolefin may be at least one selected from the group consisting of dicyclopentadiene, piperylene, butadiene and propadiene, and dicyclopentadiene is more preferably used.

In S1, the polymerization controller may be at least one selected from the group consisting of tricyclodecene, bicyclodecene, 2-methyl-2-butene and 2-methyl-1-butene.

In S1, the initiator may be at least one selected from the group consisting of tert-butyl chloride (t-BuCl, $(CH_3)_3CCl$), hydrochloric acid (HCl), n butyl chloride (t-$CH_3(CH_2)_3Cl$) and chlorocyclohexane.

In S1, the diolefin, the polymerization controller and the initiator may be mixed at a molar ratio of 1:0.5~1.5: 0.05~0.1.

In S2, the cation catalyst may be at least one selected from the group consisting of aluminum chloride ($AlCl_3$), boron trifluoride ($BF_3$), aluminum bromide ($AlBr_3$), and silica alumina.

In S2, the olefin may be added in an amount of 0.5~2.0 mol relative to 1 mol of the diolefin.

In S2, the cation catalyst may be added in an amount of 0.001~0.1 mol relative to 1 mol of the diolefin.

The polymerizing in S2 may be performed at 0~100° C. for 0.5~4 hr.

In S3, the hydrogenation catalyst is preferably at least one selected from the group consisting of nickel, palladium, cobalt, platinum and rhodium catalysts, and may be added in an amount of 0.01~0.5 mol relative to 1 mol of the diolefin. Also, the hydrogenating in S3 may be performed at a pressure of 50~150 bar and a temperature of 150~300° C.

In addition, the present invention provides a hydrocarbon resin comprising a repeating unit represented by Chemical Formula 1 below and a repeating unit represented by Chemical Formula 2 below:

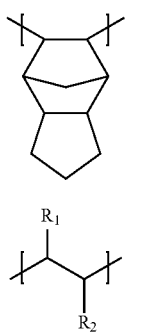

<Chemical Formula 1>

<Chemical Formula 2> in Chemical Formulas 1 and 2, $R_1$ is hydrogen or a methyl group and $R_2$ is a C3-C18 alkyl group.

The hydrocarbon resin of the present invention may have a weight average molecular weight of 500~3000 g/mol, a softening point of 10~150° C., and a color scale (APHA color) of 1~100.

In a preferred embodiment of the present invention, the hydrocarbon resin may contain 10~60 mol % of an olefin-derived component. In another preferred embodiment of the present invention, the hydrocarbon resin including a repeating unit represented by Chemical Formula 1 and a repeating unit represented by Chemical Formula 2 may be prepared through the aforementioned preparation method.

In addition, the present invention provides an adhesive composition, comprising the hydrocarbon resin including a repeating unit represented by Chemical Formula 1 and a repeating unit represented by Chemical Formula 2.

Advantageous Effects

According to the present invention, the method of preparing a hydrocarbon resin is capable of solving material supply problems with conventional hydrocarbon resins by replacing a C3 olefin, serving as a conventional hydrocarbon resin material, with a C6-C20 olefin. Furthermore, the C3 olefin essentially needs a liquefaction process before polymerization, whereas the use of the C6-C20 olefin according to the present invention can obviate the liquefaction process.

In particular, a hydrocarbon resin prepared by the method of the invention is capable of solving unique offensive odor problems with conventional hydrocarbon resins, thereby generating little odor.

Also, the hydrocarbon resin prepared by the method of the invention can exhibit low odor, high adhesion performance, a high softening point, high transparency, a low molecular weight, superior color, and high compatibility with natural rubber or synthetic rubber, and can thus be usefully employed as a tackifier or an adhesive in a variety of fields.

BEST MODE

Figure 1:
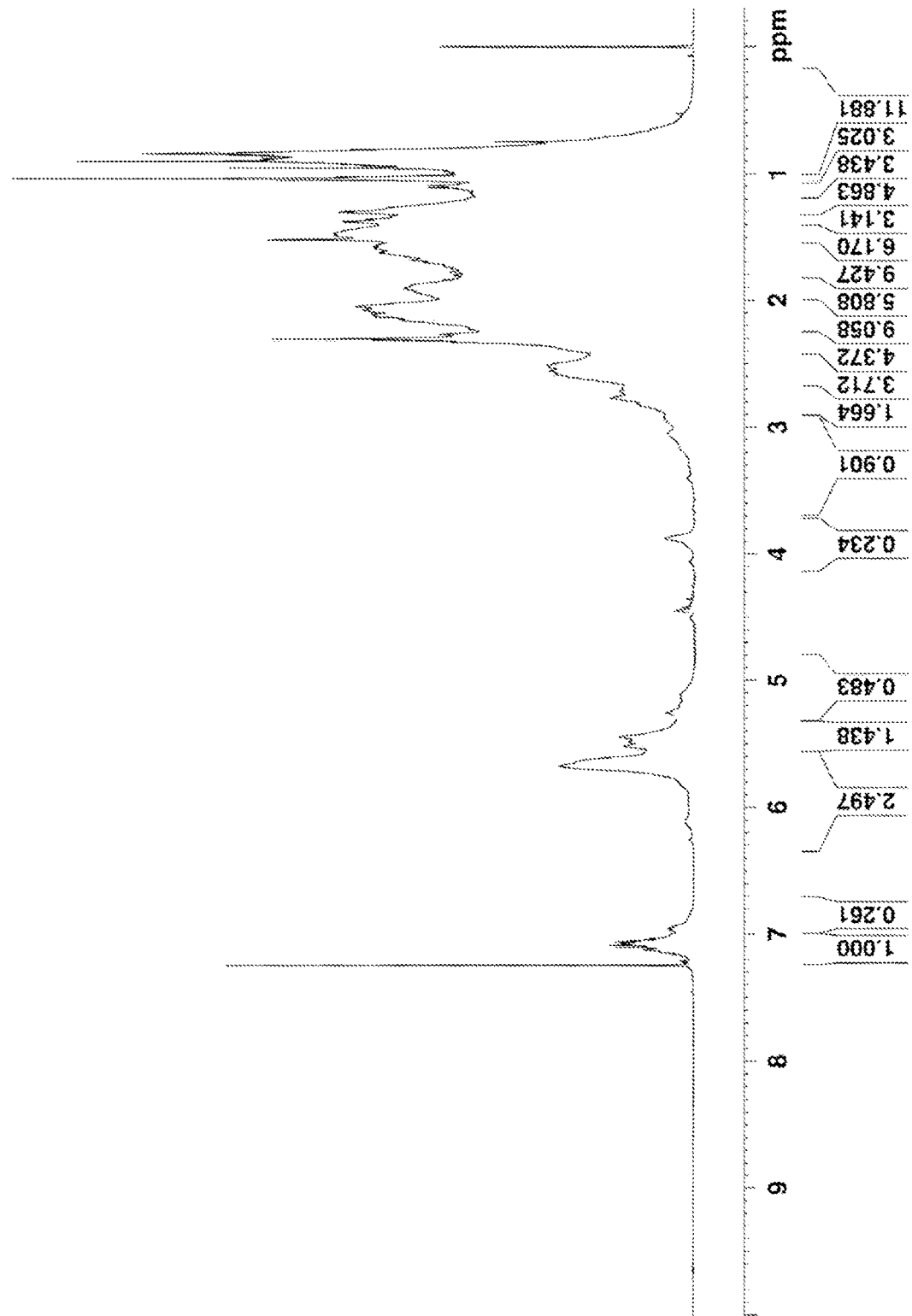
FIG. 1 shows the $^1$H-NMR spectrum of a polymer before hydrogenation in Example 4 according to the present invention.

Unless otherwise defined, all the technical and scientific terms used herein have the same meanings as those typically understood by those skilled in the art to which the present invention belongs. Generally, the nomenclature used herein is well known in the art and is typical.

The present invention addresses a method of preparing a hydrocarbon resin, comprising (S1) preparing a mixture by mixing a diolefin, a polymerization controller and an initiator; (S2) preparing a polymer by polymerizing the mixture of S1 through the addition of a C6-C20 olefin and a cation catalyst; and (S3) hydrogenating the polymer of S2 through the addition of a hydrogenation catalyst.

More specifically, according to the present invention, a C6-C20 olefin is used in lieu of a C3 olefin, which is the main material for a conventional hydrocarbon resin, and is copolymerized in the presence of a cation catalyst, thus yielding a hydrocarbon resin, thereby obviating a liquefaction process, which is essential before polymerization, and furthermore, solving material supply problems with hydrocarbon resin owing to the shortage of materials, and ensuring a yield and a preparation process that enable real-world application thereof.

In S2 of the present invention, a C6-C20 olefin is used, thus solving the problem in which it is difficult to supply a C5 olefin, serving as a main material for a conventional hydrocarbon resin and obviating the liquefaction process required upon using a C3 olefin, particularly ensuring a yield and a preparation process that enable real-world application thereof. The olefin is preferably a C6-C16 olefin, and more preferably a C6-C12 olefin.

In the method of the present invention, the C6-C20 olefin and the diolefin are polymerized and then the hydrogenation catalyst is added thereto to prepare a hydrocarbon resin. Here, the hydrocarbon resin of the invention is imparted, through the copolymerization of the olefin, with a molecular structure different from that of a conventional hydrocarbon resin, whereby the hydrocarbon resin prepared by the method of the present invention may exhibit a reduced odor compared to the conventional hydrocarbon resin.

In S2, the olefin may have one or at least two double bonds, and preferably one double bond. More preferably, a linear olefin is used.

Specifically, the olefin may include at least one selected from the group consisting of hexene, heptene, octene, nonene, decene and dodecene, and preferably at least one selected from the group consisting of linear α-olefin, such as 1-hexene, 1-heptene, 1-octene, 1-nonene, 1-decene and 1-dodecene. Particularly useful is 1-hexene, 1-octene, 1-decene or 1-dodecene in order to ensure a desired price and supply thereof.

The diolefin may be at least one selected from the group consisting of dicyclopentadiene, piperylene, butadiene and propadiene, and dicyclopentadiene is preferably used in order to realize superior copolymerization with olefin.

In S1, the polymerization controller may be at least one selected from the group consisting of tricyclodecene, bicyclodecene, 2-methyl-2-butene and 2-methyl-1-butene, and tricyclodecene is preferably used in order to control a molecular weight.

In S1, the initiator may be at least one selected from the group consisting of tert-butyl chloride (t-BuCl, $(CH_3)_3CCl$), hydrochloric acid (HCl), n butyl chloride (t-CH$_3$(CH$_2$)$_3$Cl) and chlorocyclohexane. In particular, tert-butyl chloride (t-BuCl) is preferably used in order to realize a high yield.

In S1, the diolefin, the polymerization controller and the initiator are mixed at a molar ratio of 1:0.5~1.5:0.05~0.1 in order to ensure superior properties of the hydrocarbon resin.

The diolefin is dissolved in a solvent before polymerization with the olefin, followed by polymerization with the olefin, resulting in a hydrocarbon resin. Here, the solvent may be used without limitation so long as it is able to dissolve the diolefin. Preferably, toluene, methylene chloride, hexane, xylene, trichlorobenzene, alkyl benzene or the like is used.

The amount of the solvent is not particularly limited so long as it is able to sufficiently dissolve diolefin and olefin, and may be 2~10 mol relative to 1 mol of the diolefin.

The polymerization is carried out at 0~100° C. for 0.5~4 hr. If the polymerization is performed under conditions of a temperature less than 0° C. or a time less than 0.5 hr, a low yield may result. On the other hand, if the polymerization is performed under conditions of a temperature exceeding 100° C. or a time exceeding 4 hr, a gel may be formed.

Useful in the polymerization, the cation catalyst may be used without limitation so long as it is able to polymerize the olefin and the diolefin, and is preferably at least one selected from the group consisting of aluminum chloride (AlCl$_3$), boron trifluoride (BF$_3$), aluminum bromide (AlBr$_3$), and silica alumina, and AlCl$_3$ is more preferably used in order to ensure superior properties of the hydrocarbon resin.

The cation catalyst is preferably used in an amount of 0.001~0.1 mol relative to 1 mol of the diolefin. If the amount thereof is less than 0.001 mol relative to 1 mol of the diolefin, insufficient reaction activity may result. On the other hand, if the amount thereof exceeds 0.1 mol, the removal of the catalyst is not easy, and economic benefits may be negated due to the use of a large amount of catalyst.

In S3, the hydrogenation catalyst may be selected from the group consisting of nickel, palladium, cobalt, platinum and rhodium catalysts. The use of palladium (Pd) is more preferable in order to improve hydrogenation reactivity.

The hydrogenation catalyst is preferably used in an amount of 0.01~0.5 mol relative to 1 mol of the diolefin. If the amount thereof is less than 0.01 mol relative to 1 mol of the diolefin, reactivity may decrease. On the other hand, if the amount thereof exceeds 0.5 mol, economic benefits may be negated due to the use of a large amount of catalyst.

The hydrogenation in S3 may be carried out at a pressure of 50~150 bar and a temperature of 150~300° C. If the reaction is carried out at a pressure exceeding 150 bar or a temperature higher than 300° C., the molecular structure may break down under the harsh reaction conditions. On the other hand, if the reaction pressure or temperature is less than 50 bar or 150° C. respectively, hydrogenation may not be sufficiently carried out.

The preparation method according to the present invention enables the preparation of a hydrogenated hydrocarbon resin at a high yield (conversion) of 30% or more by polymerizing the olefin and the diolefin. In the method of the present invention, the C6-C12 olefin in a liquid phase is used, whereby liquid-liquid polymerization may be carried out with high reactivity compared to gas-liquid polymerization, and the temperature for the polymerization reaction may be elevated to 40° C. or more, thereby further increasing the preparation yield.

Particularly in the present invention, a portion of a C5 diolefin, the shortage of which is becoming severe among materials for a hydrocarbon resin, may be replaced with a C6-C20 olefin, thereby solving the problem in which the supply of hydrocarbon resin material is insufficient.

In addition, the present invention addresses a hydrocarbon resin including a repeating unit represented by Chemical Formula 1 below and a repeating unit represented by Chemical Formula 2 below.

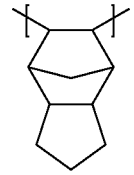

<Chemical Formula 1>

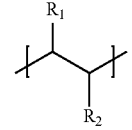

<Chemical Formula 2>

In Chemical Formulas 1 and 2, R$_1$ is hydrogen or a methyl group and R$_2$ is a C3-C18 alkyl group.

The hydrocarbon resin of the present invention is configured such that no double bond remains in the cyclic structure thereof and the odor is reduced by polymerizing a C6-C20 olefin, which substitutes for a portion of dicyclopentadiene, which has a strong odor. Hydrogenation is conducted so that no double bond remains, as represented by Chemical Formulas 1 and 2, and also, the odor of the hydrocarbon resin may be reduced by polymerizing the C6-C20 olefin.

Also, the hydrocarbon resin of the present invention may increase compatibility with various polymers by virtue of olefin polymerization, thus enhancing adhesion and cohesion.

The hydrocarbon resin of the present invention has a weight average molecular weight of 500~3,000 g/mol, a softening point of 10~150° C., and a color scale (APHA color) of 1~100. If the weight average molecular weight thereof is less than 500 g/mol, adhesion may deteriorate. On the other hand, if the weight average molecular weight thereof exceeds 3000 g/mol, compatibility may decrease. If the softening point thereof is less than 10° C., adhesion may deteriorate. On the other hand, if the softening point thereof is higher than 150° C., it is difficult to perform the preparation process.

If the color scale (APHA color) exceeds 100, a poor color may result, which is considered a defect upon the preparation of an adhesive.

The hydrocarbon resin of the present invention may contain 10~60 mol % of an olefin-derived component. If the amount of the olefin is less than 10 mol %, it is difficult to exhibit olefin copolymerization properties. On the other hand, if the amount thereof exceeds 60 mol %, adhesion performance may deteriorate.

The hydrocarbon resin prepared according to the present invention is able to impart tackiness and adhesiveness to a hot-melt adhesive, a pressure-sensitive adhesive, ink, paint, road-marking paint, and the like, and may be blended with various resins, such as natural rubber, synthetic rubber and the like, and may thus be usefully employed as an adhesive or a tackifier.

MODE FOR INVENTION

A better understanding of the present invention may be obtained through the following examples, which are set forth to illustrate, but are not to be construed as limiting the scope of the present invention.

EXAMPLES

Example 1

In a 1 L autoclave, dicyclopentadiene (DCPD) was dissolved in 500 ml of a toluene solvent, and a polymerization controller, tricyclodecene (TCDE), was then added thereto. Also, an initiator, t-BuCl, was added thereto, and the reactor was closed, after which an olefin was added thereto, and the resulting mixture was added with a catalyst and then allowed to react. The reaction temperature was maintained at 40° C. and the reaction was terminated after 2 hr. After completion of the reaction, the produced polymer was mixed with 300 g of water to separate the catalyst, and was then distilled at 200° C. for 5 min to recover unreacted oil fractions, thus obtaining 300 g of the remaining polymer.

The 300 g of the polymer thus obtained was added with a hydrogenation solvent, toluene, in an amount 1.5 times the amount of the polymer, which was thus completely dissolved, and was then placed in a 1 L autoclave. Thereafter, 60 g of a palladium catalyst was added thereto, and the reactor was closed, after which a hydrogenation reaction was carried out at a hydrogen pressure of 80 bar and a temperature of 230° C. for 90 min. After termination of the reaction, the produced reaction liquid was distilled in a vacuum of 5 torr at 250° C. for 5 min, thereby yielding 150 g of a hydrogenated hydrocarbon resin (a yield of 41%). The kinds and amounts of individual components of the hydrocarbon resin are given in Table 1 below.

Examples 2 to 7

The hydrocarbon resins of Examples 2 to 7 were prepared in the same manner as in Example 1 under the conditions shown in Table 1 below.

Figure 2:
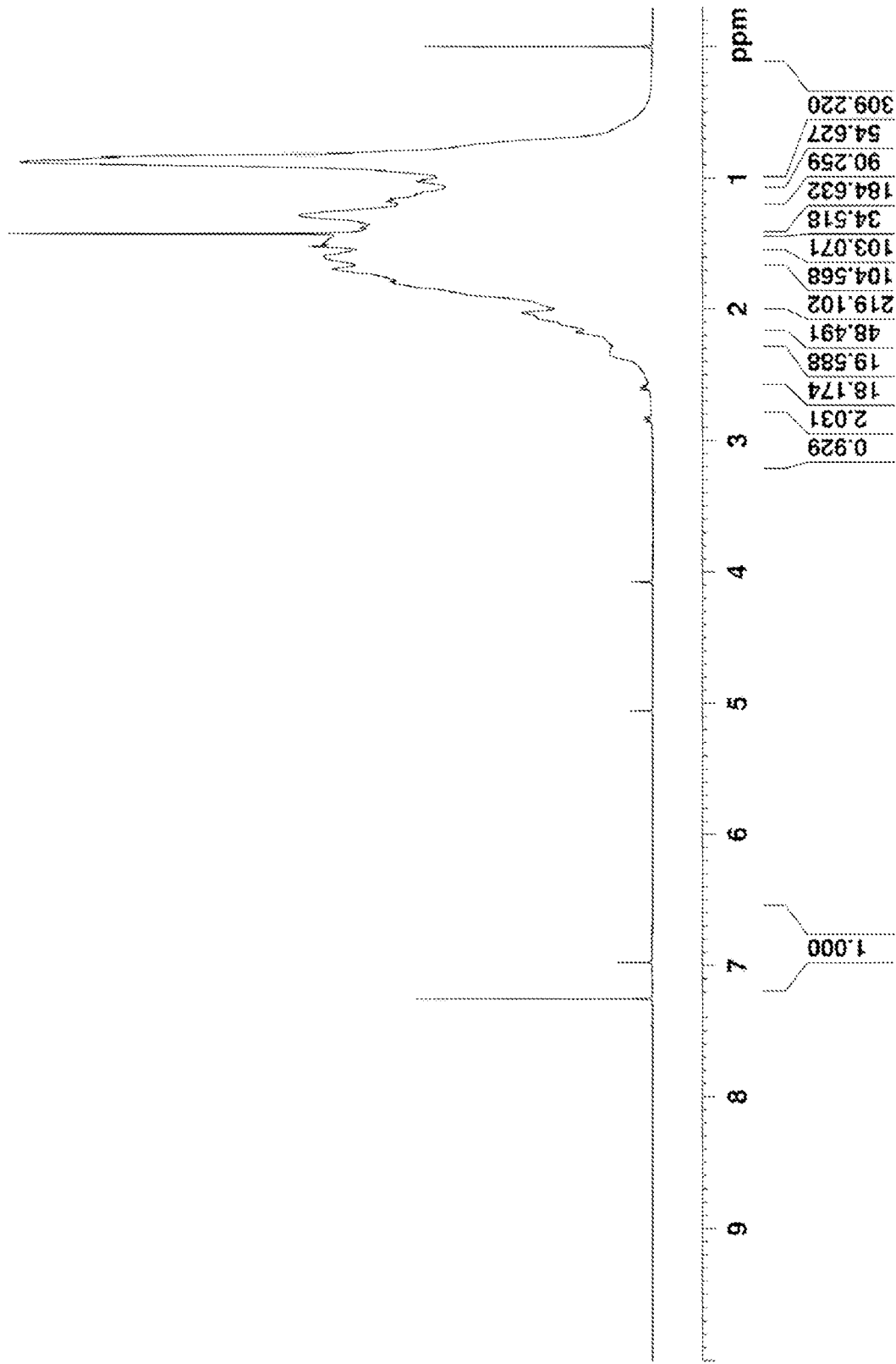
FIG. 2 shows the $^1$H-NMR spectrum of a hydrocarbon resin after hydrogenation in Example 4 according to the present invention.

The $^1$H-NMR spectrum results of the polymer before hydrogenation and the hydrocarbon resin after hydrogenation in Example 4, measured using an NMR spectrometer (500 NMR made by Bruker, 14.1 tesla), are shown in FIGS. 1 and 2, respectively. Based on the $^1$H-NMR spectrum results of FIGS. 1 and 2, the polymer before hydrogenation and the hydrocarbon resin after hydrogenation were confirmed to be polymerized.

Comparative Example 1

In a 1 L autoclave, dicyclopentadiene (DCPD) was dissolved in 500 ml of a toluene solvent, and a polymerization controller, tricyclodecene (TCDE), was then added thereto. Also, an initiator, t-BuCl, was added thereto, DCPD and piperylene were added thereto, and the reactor was closed, after which the resulting mixture was added with 0.038 mol of a catalyst $BF_3$ and then allowed to react. The reaction temperature was maintained at 40° C. and the reaction was terminated after 2 hr. After completion of the reaction, the produced polymer was mixed with 300 g of water to separate the catalyst, and was then distilled at 200° C. for 5 min to recover unreacted oil fractions, thus obtaining 300 g of the remaining polymer.

The 300 g of the polymer thus obtained was added with a hydrogenation solvent, toluene, in an amount 1.5 times the amount of the polymer, which was thus completely dissolved, and was then placed in a 1 L autoclave. Thereafter, 60 g of a palladium catalyst was added thereto, and the reactor was closed, after which a hydrogenation reaction was carried out at a hydrogen pressure of 80 bar and a temperature of 230° C. for 90 min. After termination of the reaction, the produced reaction liquid was distilled in a vacuum of 5 torr at 250° C. for 5 min, thereby yielding 175 g of a hydrogenated hydrocarbon resin (a yield of 56%). The kinds and amounts of individual components are given in Table 1 below.

Comparative Examples 2 to 8

The hydrocarbon resins of Comparative Examples 2 to 8 were prepared in the same manner as in Example 1 under the conditions shown in Table 1 below.

Figure 3:
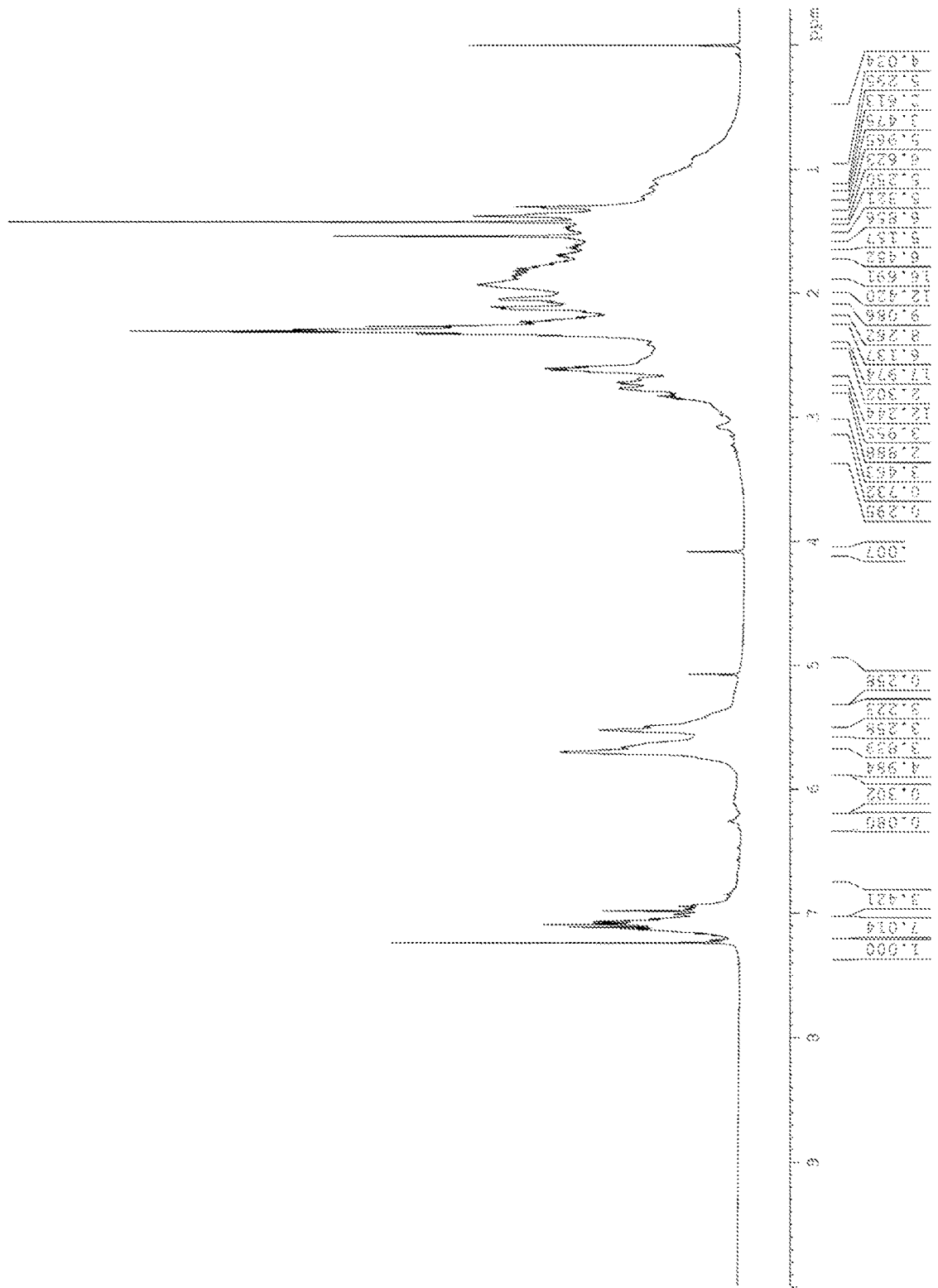
FIG. 3 shows the $^1$H-NMR spectrum of a polymer before hydrogenation in Comparative Example 3 according to the present invention.
Figure 4:
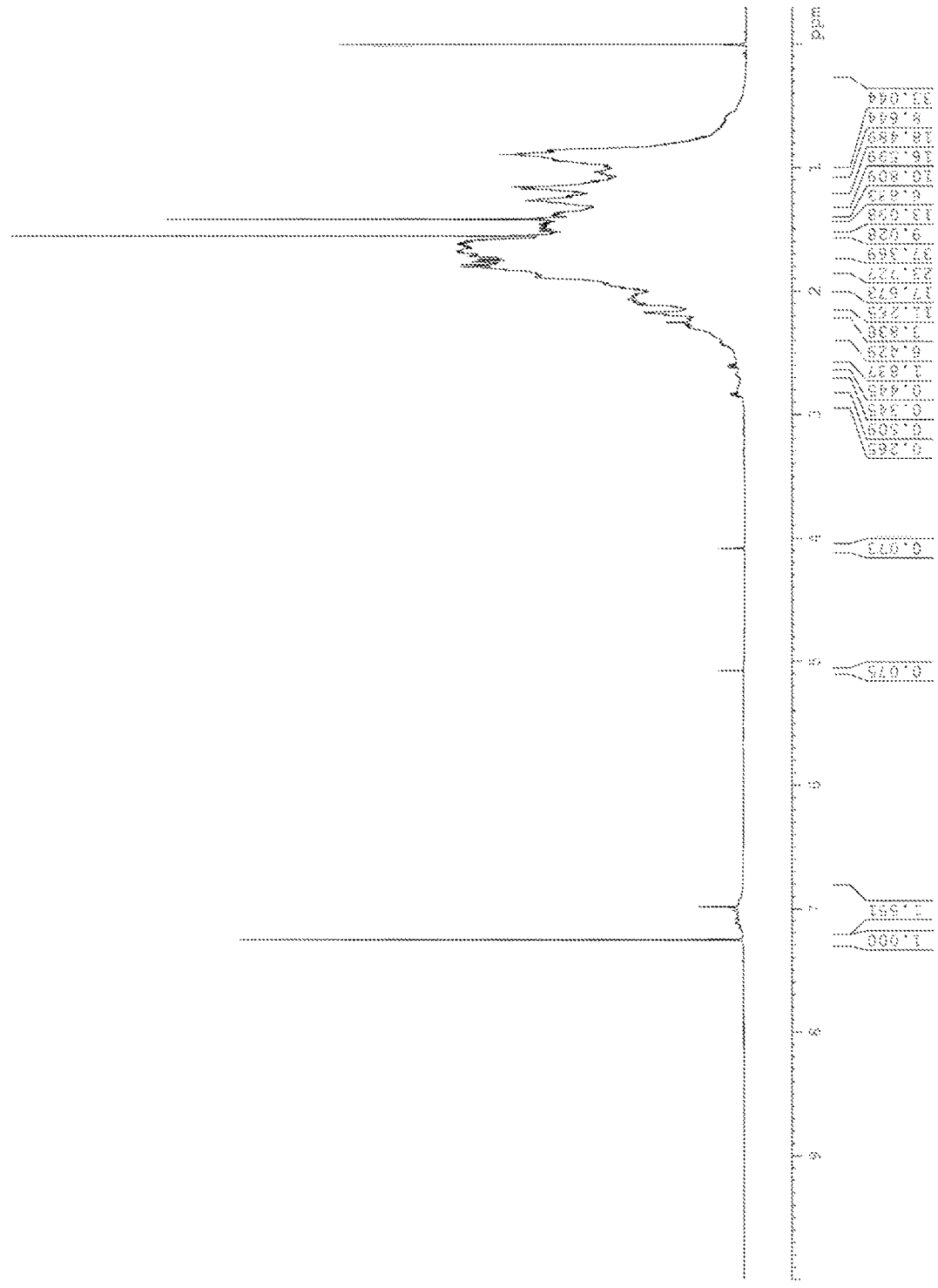
FIG. 4 shows the $^1$H-NMR spectrum of a hydrocarbon resin after hydrogenation in Comparative Example 3 according to the present invention.

The $^1$H-NMR spectrum results of the polymer before hydrogenation and the hydrocarbon resin after hydrogenation in Comparative Example 3, measured using an NMR spectrometer (500 NMR made by Bruker, 14.1 tesla), are shown in FIGS. 3 and 4, respectively. Based on the $^1$H-NMR spectrum results of FIGS. 3 and 4, the polymer before hydrogenation and the hydrocarbon resin after hydrogenation were confirmed to be polymerized.

TABLE 1

| | Material (mol) | | | | | | | Polymerization controller | Initiator | Cation catalyst | | Hydrogenation catalyst | Polymerization conditions (S2) | | Hydrogenation conditions (S3) | |
|---|---|---|---|---|---|---|---|---|---|---|---|---|---|---|---|---|
| | Diolefin | | Olefin | | | | | | | | | | | | | |
| No. | DCPD | Piperylene | 1-propene | 1-hexene | 1-octene | 1-decene | 1-dodecene | (mol) TCDE | (mol) t-BuCl | (mol) $BF_3$ | (mol) $AlCl_3$ | (mol) Pd | temperature (° C.) | Time (hr) | temperature (° C.) | Pressure bar |
| Ex. 1 | 1.06 | — | — | 1.06 | — | — | — | 1.06 | 0.075 | 0.038 | — | 0.2 | 40 | 2 | 230 | 80 |
| Ex. 2 | 0.8 | — | — | 1.6 | — | — | — | 0.8 | 0.075 | 0.038 | — | 0.2 | 40 | 2 | 230 | 80 |
| Ex. 3 | 0.8 | — | — | 1.6 | — | — | — | 0.8 | 0.075 | — | 0.038 | 0.2 | 40 | 2 | 230 | 80 |
| Ex. 4 | 0.8 | — | — | — | 1.6 | — | — | 0.8 | 0.075 | 0.038 | — | 0.2 | 40 | 2 | 230 | 80 |
| Ex. 5 | 0.8 | — | — | — | 1.6 | — | — | 0.8 | 0.075 | — | 0.038 | 0.2 | 40 | 2 | 230 | 80 |
| Ex. 6 | 0.8 | — | — | — | — | 1.6 | — | 0.8 | 0.075 | — | 0.38 | 0.2 | 40 | 2 | 230 | 80 |
| Ex. 7 | 0.8 | — | — | — | — | — | 1.6 | 0.8 | 0.075 | — | 0.38 | 0.2 | 40 | 2 | 230 | 80 |
| Ex. 8 | 0.8 | | | | | 1,6 (β-octene) | | 0.8 | 0.075 | — | 0.38 | 0.2 | 40 | 2 | 230 | 80 |
| C. Ex. 1 | 1.06 | 1.06 | — | — | — | — | — | 1.06 | — | — | 0.038 | 0.2 | 30 | 2 | 230 | 80 |
| C. Ex. 2 | — | 1.6 | — | — | — | — | — | 1.6 | — | — | 0.038 | 0.2 | 30 | 2 | 230 | 80 |

TABLE 1-continued

| | Material (mol) | | | | | | | Polymeri- | | | | Hydro- | Polymerization conditions (S2) | | Hydrogenation conditions (S3) | |
|---|---|---|---|---|---|---|---|---|---|---|---|---|---|---|---|---|
| | Diolefin | Olefin | | | | | | zation controller | Initiator | Cation catalyst | | genation catalyst | Temperature | Time | Temperature | Pressure |
| No. | DCPD | Piperylene | 1-propene | 1-hexene | 1-octene | 1-decene | 1-dodecene | (mol) TCDE | (mol) t-BuCl | (mol) BF$_3$ | (mol) AlCl$_3$ | (mol) Pd | (° C.) | (hr) | (° C.) | bar |
| C. Ex. 3 | 1.6 | — | — | — | — | — | — | 1.6 | — | 0.038 | | 0.2 | 40 | 2 | 230 | 80 |
| C. Ex. 4 | 1.06 | — | 1.06 | — | — | — | — | 1.06 | 0.075 | — | 0.038 | 0.2 | 40 | 2 | 230 | 80 |
| C. Ex. 5 | 1.06 | — | — | 1.06 | — | — | — | 1.06 | 0.075 | — | 0.038 | — | 40 | 2 | | |
| C. Ex. 6 | 1.06 | — | — | — | 1.06 | — | — | 1.06 | 0.075 | — | 0.038 | — | 40 | 2 | | |
| C. Ex. 7 | 1.06 | — | — | — | — | 1.06 | — | 1.06 | 0.075 | | 0.038 | — | 40 | 2 | | |
| C. Ex. 8 | 1.06 | — | — | — | — | — | 1.06 | 1.06 | 0.075 | | 0.038 | — | 40 | 2 | | |

<Evaluation of Properties>
(1) Yield
The yield was determined as follows.

Yield (%)=obtained resin (g)/total of added monomers (g) 100

(2) Softening Point
A softening point was measured using a ring-and-ball softening method (ASTM E 28). The resin was dissolved and placed in a ring-shaped mold, which was then hung on a beaker containing glycerin, after which a ball was placed on the resin-containing ring and the temperature was elevated at a rate of 2.5° C./min to reach the temperature at which the resin was dissolved, and the temperature (softening point) at which the ball fell was measured. The results are shown in Table 3 below.

(3) Molecular Weight
Through gel permeation chromatography (GPC) (PL GPC-220) using a polystyrene standard, a weight average molecular weight, a number average molecular weight and a z-average molecular weight were measured. The hydrogenated hydrocarbon resin to be measured was dissolved in 1,2,4-trichlorobenzene so as to have a concentration of 0.34 wt %, and 288 μL thereof was introduced into GPC. The mobile phase of GPC was 1,2,4-trichlorobenzene, and was introduced at a flow rate of 1 mL/min, and analysis was conducted at 130° C. Two guard columns and one PL 5 μm mixed-D column were connected in series. Measurement was performed by elevating the temperature to 250° C. at a rate of 10° C./min using a differential scanning calorimeter, and analysis was conducted in an N$_2$ atmosphere up to the 2nd scan. The results are shown in Table 3 below.

In Table 3, Mn indicates the number average molecular weight, Mw indicates the weight average molecular weight, Mz indicates the z-average molecular weight, and PD (polydispersity) indicates Mw/Mn.

(4) Olefin Content in Resin
The olefin content (mol %) in the polymer was analyzed based on $^1$H-NMR spectrum results using an NMR spectrometer (500 NMR made by Bruker, 14.1 tesla).

(5) Color (APHA)
Color was measured in accordance with ASTM D1544. Specifically, 10.0 g of the hydrogenated hydrocarbon resin was dissolved in 10.0 g of toluene and was then placed in a quartz cell having a rectangular cross-section (a width of 5 cm, a length of 4 cm and a path length of 50 mm). This cell was mounted to a PFX195 colorimeter and operated to measure an APHA color.

(6) Specific Gravity
A specific gravity was measured in accordance with ASTM D71. Specifically, 5 g of the hydrogenated hydrocarbon resin was dissolved on a hot plate at 200° C. and poured into a sphere-shaped mold, and the cured hydrogenated hydrocarbon resin having a sphere shape was removed from the mold and then placed in a densimeter (QUALITEST: Densimeter SD-200L) to measure the specific gravity thereof.

(7) Odor Intensity
The odor intensity of the hydrocarbon resin was evaluated using a panel comprising five male and female participants. 10 g of the hydrocarbon resin was placed in a 100 ml beaker, which was then placed in an oven at 180° C. for 30 min. The beaker in a hot state was taken out of the oven and the odor generated from the hydrocarbon resin was evaluated. The odor intensity was evaluated in a manner in which the participants smelled the odor, and the results thereof were classified into numerical values according to the classification table of Table 2 below, after which a score from 0 to 5 was assigned and the average score was calculated.

TABLE 2

| Score | Odor intensity | Description |
|---|---|---|
| 0 | None | Relatively odorless level and state in which no smell is detected |
| 1 | Threshold | State of not being able to identify the smell but being able to sense the smell |
| 2 | Moderate | State of being able to identify the smell |
| 3 | Strong | Strong smell that is easy to detect (state of being able to detect the unique smell of cresol in hospital) |
| 4 | Very strong | Very strong smell (severe condition in conventional toilet) |
| 5 | Over strong | Extremely strong smell that is hard to withstand to the extent of feeling interference with breathing |

<Results of Evaluation of Properties of Resin>

The results measured as above are shown in Table 3 below.

TABLE 3

| No. | Yield (%) | Softening point (° C.) | Molecular weight | | | | Olefin content in resin (mol %) | Color APHA | Specific gravity | Odor |
|---|---|---|---|---|---|---|---|---|---|---|
| | | | Mn | Mw | Mz | PD | | | | |
| Ex. 1 | 41 | 110 | 417 | 1569 | 8104 | 3.76 | 42 | 20 | 1.03 | 1.6 |
| Ex. 2 | 39 | 91 | 502 | 1400 | 9521 | 2.79 | 51 | 30 | 1.03 | 1.4 |
| Ex. 3 | 50 | 95 | 682 | 1651 | 10101 | 2.42 | 55 | 20 | 1.03 | 1.2 |
| Ex. 4 | 48 | 95 | 515 | 1398 | 9132 | 2.71 | 50 | 20 | 1.04 | 1.2 |
| Ex. 5 | 52 | 97 | 695 | 1752 | 9548 | 2.52 | 49 | 20 | 1.03 | 1.0 |
| Ex. 6 | 50 | 100 | 701 | 1871 | 9582 | 2.67 | 40 | 20 | 1.03 | 0.9 |
| Ex. 7 | 53 | 101 | 721 | 1825 | 10902 | 2.53 | 38 | 20 | 1.03 | 0.9 |
| Ex. 8 | 49 | 109 | 550 | 1685 | 8624 | 3.06 | 30 | 20 | 1.04 | 1.2 |
| C. Ex. 1 | 56 | 85 | 861 | 2875 | 11323 | 3.34 | 35 | 25 | 1.05 | 2.9 |
| C. Ex. 2 | 61 | 90 | 627 | 2100 | 9321 | 3.34 | 0 | 20 | 1.05 | 2.7 |
| C. Ex. 3 | 55 | 120 | 303 | 733 | 5542 | 2.41 | 0 | 20 | 1.08 | 3.2 |
| C. Ex. 4 | 30 | 80 | 303 | 654 | 3452 | 2.16 | 30 | 20 | 1.05 | 4.5 |
| C. Ex. 5 | 40 | 105 | 405 | 1520 | 8050 | 3.75 | 42 | 500 or more | 1.08 | 4.2 |
| C. Ex. 6 | 46 | 90 | 504 | 1299 | 8682 | 2.57 | 50 | 500 or more | 1.08 | 4.0 |
| C. Ex. 7 | 49 | 98 | 698 | 1851 | 9520 | 2.65 | 40 | 500 or more | 1.07 | 3.9 |
| C. Ex. 8 | 51 | 99 | 705 | 1859 | 10885 | 2.64 | 38 | 500 or more | 1.07 | 3.9 |

As is apparent from Table 3, Examples 1 to 7 exhibited slightly low yield compared to Comparative Examples 1 to 3, but had equivalent yield.

The color scale of the hydrocarbon resin of Examples was 20 or more, which means that the hydrocarbon resin of the invention is suitable for use by being mixed with other resins.

Moreover, the hydrocarbon resin of Examples manifested significantly reduced odor compared to Comparative Examples.

In particular, in Comparative Example 4, pertaining to the preparation of a hydrocarbon resin using propylene as disclosed in Korean Patent Application No. 2013-0111233, a remarkably lowered yield, a high specific gravity and a considerably high odor resulted.

Therefore, the method of preparing the hydrocarbon resin according to the present invention is able to replace the C3 monomer, which is a conventional hydrocarbon resin material, with the other material, thus solving material supply problems, and also ensuring a preparation process and a yield that enable real-world application thereof, by preparing the hydrocarbon resin using a catalyst that is inexpensive and is easy to handle.

Although specific embodiments of the present invention have been disclosed in detail as described above, it is obvious to those skilled in the art that such description is merely of preferable exemplary embodiments and is not to be construed to limit the scope of the present invention. Therefore, the substantial scope of the present invention will be defined by the appended claims and equivalents thereof.

The invention claimed is:

1. A hydrocarbon resin, comprising a repeating unit represented by Chemical Formula 1 below and a repeating unit represented by Chemical Formula 2 below:

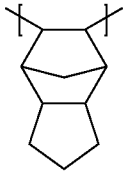

<Chemical Formula 1>

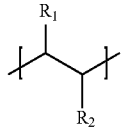

<Chemical Formula 2> in Chemical Formula 2, $R_1$ is hydrogen or a methyl group and $R_2$ is a C3-C18 alkyl group,
wherein the hydrocarbon resin has a weight average molecular weight of 500~3000 g/mol, a softening point of 10~150° C., and a color scale (APHA color) of 1~100.

2. The hydrocarbon resin of claim 1, wherein the hydrocarbon resin contains 10-60 mol % of a component derived from non-diolefinic olefin.

3. An adhesive composition comprising the hydrocarbon resin of claim 1.

* * * * *